INVENTOR
DONALD F. WILKES

BY Burns, Doane, Benedict, Swecker & Mathis
ATTORNEYS

Dec. 23, 1969 D. F. WILKES 3,486,143

MAGNETIC SWITCHES

Filed March 25, 1968 5 Sheets-Sheet 3

FIG. 19
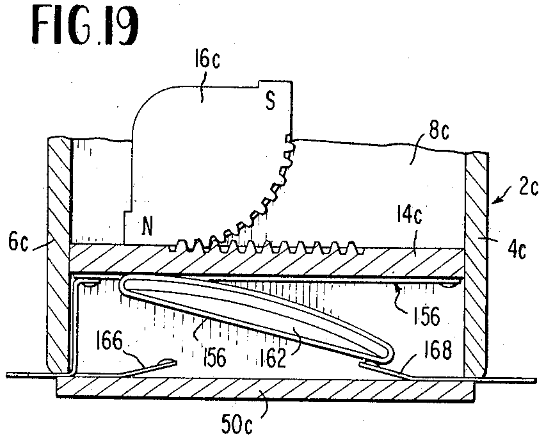
FIG. 22
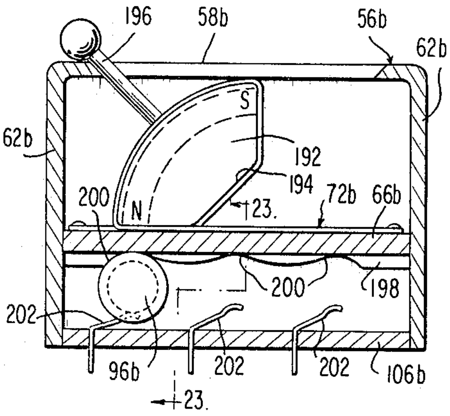
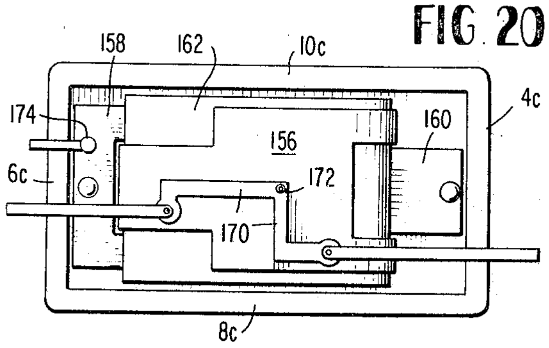
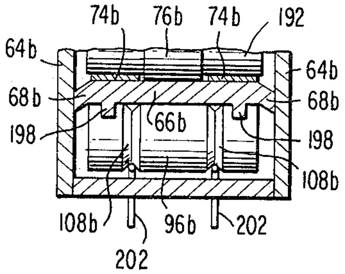
FIG. 23
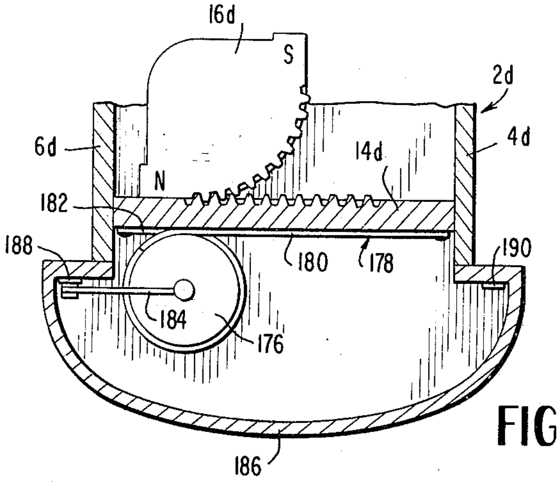
FIG. 21

3,486,143
MAGNETIC SWITCHES
Donald F. Wilkes, Albuquerque, N. Mex., assignor to Rolamite Technology, Incorporated, San Francisco, Calif., a corporation of California
Filed Mar. 25, 1968, Ser. No. 715,700
Int. Cl. H01h 9/00
U.S. Cl. 335—205 30 Claims

ABSTRACT OF THE DISCLOSURE

A switch utilizing magnetic forces for rapidly and efficiently displacing switch components to make and break electrical circuits. A permanently magnetized actuating element cooperates with the switch housing to latch the switch in predetermined stable and balanced positions. A ferromagnetic follower in the housing is displaced from one position to another in response to movement of the actuating element.

BACKGROUND OF THE INVENTION

This invention relates to devices for making and breaking electrical circuits, and more particularly to switches in which the electrical contacts move into and out of engagement rapidly.

A great variety of switches are in use for accomplishing various functions. These switches include single and multipole switches with contacts that are opened and closed in response to single or multiple direction movement of a lever or key. In conventional configurations these switches are individually designed, depending upon the arrangement of the switch contacts and the required motion of the switch lever. As a result, switch manufacturers must maintain a large inventory of different types and sizes of switches and must provide manufacturing facilities for each of the different types. A switch configuration that could be readily adapted to a variety of terminal arrangements and actuator motions, therefore, would be desirable.

Another difficulty with conventional swtiches is that the switch structure often is complex and the switches are difficult to assemble. Also, the component parts are expensive to produce. Furthermore, conventional switches often are not sufficiently reliable and resistant to shock or jarring.

In view of these deficiencies of conventional switches, it is an object of this invention to provide a switch mechanism which is versatile and readily adapted to a variety of electric contact configurations and arrangements.

Another object of this invention is to provide a switch mechanism which has relatively few component parts, and yet operates reliably and effectively.

A further object of this invention is to provide a switch mechanism which is capable of resisting shock and jarring, and is capable of operating in hazardous environments.

Still another object of this invention is to provide a switch mechanism that has inexpensive components and is easily assembled.

SUMMARY OF THE INVENTION

These objects are accomplished in accordance with several preferred embodiments of the invention by a switch mechanism having a housing, with a transverse guide or membrane dividing the housing into upper and lower compartments. An actuating element in the upper compartment is permanently magnetized and pivotally mounted, so that it is movable between one position in which one of the magnetic poles is adjacent the membrane, and the other position in which the opposite pole is adjacent the membrane. Appropriate electric contacts are mounted in the lower compartment. A follower having a rolling surface is movable along the guide or membrane into and out of engagement with the electrical contacts. The follower is formed of a ferromagnetic material and portions of the follower conduct current when the follower engages the contacts. At least a portion of the housing completes a magnetic circuit between the opposite poles of the actuating element in order to latch the follower at one end of its path of travel. Preferably, the actuating element is restrained from sliding movement relative to the membrane. The electrical contacts engage the follower in such a way that there is sliding movement between the follower and the electrical contacts in order to remove surface oxidation or other deleterious effects of repeatedly making and breaking an electrical circuit.

DETAILED DESCRIPTION OF THE DRAWINGS

These preferred embodiments and modifications thereof are illustrated in the accompanying drawings in which:

FIG. 19 is a cross sectional view of a third modified form of the switch of FIG. 1;

FIG. 20 is a bottom plan view of the switch of FIG. 19, with the bottom cover plate removed;

FIG. 21 is a cross sectional view of a fourth modified form of the switch of FIG. 1;

FIG. 22 is a cross sectional view of a modified form of the switch of FIG. 7, wherein the switch has three stable positions;

FIG. 23 is a cross sectional view of the switch along the line 23—23 in FIG. 22;

DETAILED DESCRIPTION OF PREFERRED EMBODIMENTS

Figure 1:
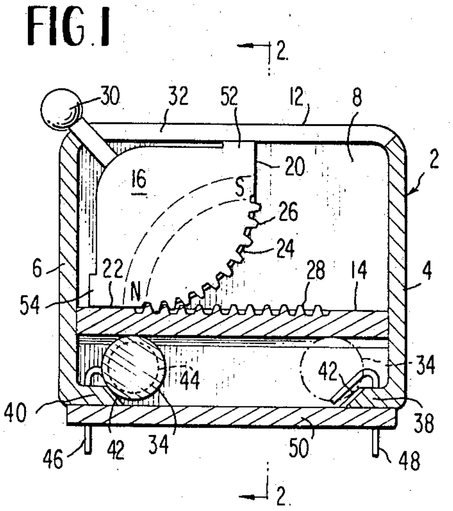
FIG. 1 is a cross sectional view of one embodiment of the switch of this invention along the line 1—1 in FIG. 2.
Figure 2:
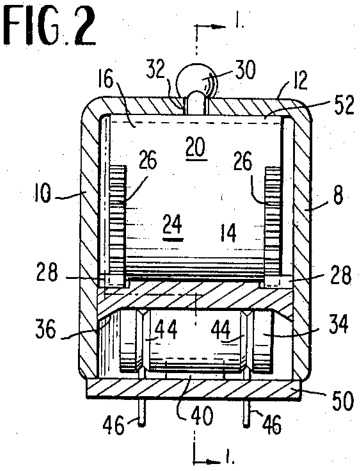
FIG. 2 is a cross sectional view of the switch along the line 2—2 in FIG. 1.
Figure 3:
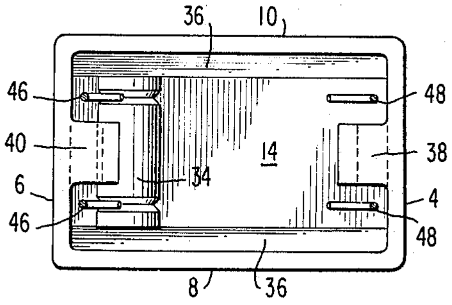
FIG. 3 is a bottom plan view of the switch of FIG. 1, with the bottom cover plate removed.
Figure 4:
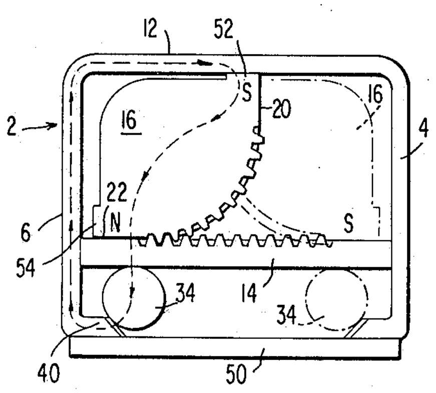
FIG. 4 is a schematic view of the switch of FIG. 1, showing the magnetic latching circuit.

One preferred embodiment of the switch of this invention is illustrated in FIGS. 1 to 6. The switch includes a housing 2 having opposite end walls 4 and 6, and opposite side walls 8 and 10. A top 12 is joined to the side and end walls.

A guide 14 is mounted in the housing 2 and extends between the opposite end walls 4 and 6. An actuating element 16 is mounted in the housing 2, between the upper surface of the guide 14 and the interior surface of the top 12. The actuating element 16 is formed of a readily magnetized material, such as Alnico-5, an iron-cobalt-nickel alloy. The magnetic flux within the element 16 flows primarily along the curved path 18 illustrated schematically in FIG. 1. The north pole is indicated at N and the south pole is indicated at S. The path 18 has substantially the same pattern across the width of the element 16. The outer surface of the element 16 adjacent the south pole S is indicated at 20, while the outer surface of the element adjacent the north pole N is indicated at 22. The flux along the path 18 is approximately uniform across the width of the element 16.

The element 16 may be permanently magnetized in accordance with any conventional and well known processes to produce the magnetic orientation as shown in FIG. 1. One manner of producing such magnetization is to place the element 16 between opposite poles of a strong magnet, with the north pole of the magnet being positioned at the surface 20, and the south pole of the magnet being positioned at the surface 22. The flux through the element 16 between the poles of the magnet is concentrated along the path 18, and after a period of time, the element 16 is permanently magnetized with north and south poles, as indicated in FIG. 1.

The element 16 has a cylindrical bearing surface 24 extending between the pole surfaces 20 and 22. The surface 24 engages the upper surface of the guide 14 and supports the element 16 for rolling along the surface of the guide 14. Sector gears 26 along opposite sides of the element 16 engage racks 28 on the guide 14 to prevent sliding on the element 16 relative to the guide 14.

Motion is imparted to the element 16 by a lever 30 which projects through a slot 32 in the top 12 of the housing. When the lever 30 is displaced toward the right, as viewed in FIG. 1, the cylindrical surface 24 of the element 16 rolls along the surface of the guide 14 until the element is rotated approximately 90°. The pole surface 20 then engages the upper surface of the guide 14 at the right hand end of the rack 28, corresponding to the position of the pole surface 22 that is illustrated in FIG. 1.

The bottom surface of the guide 14 supports a follower 34 for rolling movement from the position shown in full lines in FIG. 1 to the position shown in dotted lines adjacent the opposite wall 4 of the housing. Sloping shoulders 36 along opposite edges of the guide 14 prevent axial displacement of the follower 34 relative to the guide 14. Abutments for limiting the path of movement of the follower 34 are provided by tabs 38 and 40 which project inwardly from the end walls 4 and 6, respectively.

The follower 34 is formed of a ferromagnetic material, which also is electrically conductive. Coatings or layers 42 may be provided across the ends of the tabs 38 and 40 to electrically insulate the follower 34 from the housing 2. The guide 14 may also include means, such as a coating on lower surface, for insulating the follower from the housing 2. Of course, the entire guide 14 may be constructed of insulating material. The follower 34 has a pair of circumferential grooves 44 and a pair of contact wires 46 and 48 are provided adjacent each tab 38 and 40. The contact wires 46 and 48 are aligned with the grooves 44. When the follower engages both wires at one end of its path of motion, an electrical circuit is completed through the follower from one contact wire to the other contact wire. The bottom of the housing 2 is closed by a cover plate 50 of an electric and magnetic insulating material. The contact wires 46 and 48 are supported by the cover plate 50.

It is desirable for a switch to be latched in predetermined positions, such as "on and "off" positions, thereby preventing the actuating lever to be displaced accidentally from one position to another. It is also desirable for the electrical contacts to be connected and disconnected rapidly, so that pitting and excessive oxidation does not occur at the electrical contacts. The switch of this invention provides these characteristics by cooperation of the housing and the actuating element in a magnetic circuit. The switch of FIG. 1 is illustrated schematically in FIGS. 4 to 6. When the actuating element 16 is in the position shown in full lines in FIG. 4, the north pole surface 22 engages the upper surface of the guide 14, while the south pole surface 20 is spaced a substantial distance above the guide 14. In this embodiment, the guide 14 is formed of a non-magnetic material. Ribs or flanges 52 and 54 project outwardly from the actuating element 16 adjacent the south pole S and the north pole N, respectively. The rib 52 engages the top 12 when the element 16 is in the position shown in full lines in FIG. 4, and when the element is rotated 90° along the guide 14 to the position shown in dotted lines, the rib 54 engages the top 12. The top 12, the end walls 4 and 6, and the tabs 38 and 40 are formed of ferromagnetic materials, such as soft iron. These portions of the housing cooperate with the ferromagnetic follower 34 to complete a magnetic circuit between the north and south poles of the element 16, as shown by dotted lines and arrows in FIG. 4. Since there is direct engagement between the rib 52 and the top 12, the magnetic flux across this junction resists rotation of the actuator 16.

Figure 5:
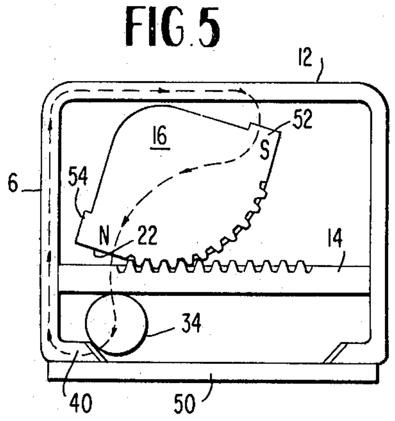
FIG. 5 is a schematic view of the switch of FIG. 1, showing the actuating element rotated clockwise from the position shown in FIG. 4.
Figure 6:
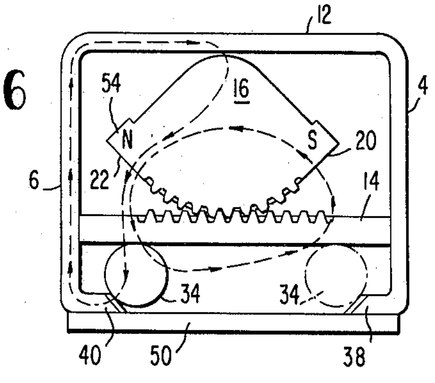
FIG. 6 is a schematic view of the switch of FIG. 1, showing the actuating element rotated in a clockwise direction from the position shown in FIG. 5 and positioned about midway of its path along the guide.

When sufficient force is applied to the lever 30 to overcome the flux coupling between the rib 52 and the top 12, the element 16 rotates in a clockwise direction through the intermediate position shown in FIG. 5. As soon as an air gap is established between the rib 52 and the top 12, resistance to rotation of the element 16 due to magnetic flux is greatly reduced. Although the north pole surface 22 has been raised relative to the guide 14, as the element rotates, the follower 34 remains in engagement with the tab 40 because the flux path links the follower with the tab 40 and resists separation of these adjacent surfaces. When the element 16 has rotated to the position shown in FIG. 6, which is approximately midway of its travel, the south pole surface 20 is spaced in substantial distance from the top 12 and the flux path between the element 16 and the top 12 is located in a region spaced approximately equally from the north and south poles. Consequently, this flux density is considerably reduced. Another flux path, which is shown in dotted lines and arrows in FIG. 6, extends between the north pole N and the south pole S and passes through the follower 34. As the element 16 continues to rotate in a clockwise direction, the magnetic attraction of the south pole S exerts a greater force on the follower than the force due to flux between the tab 40 and the follower. Ultimately, the follower is displaced toward the right, as viewed in FIG. 6. As the follower 34 approaches the south pole S, the magnetic attraction increases. Therefore the follower moves rapidly and continuously from the position shown in full lines in FIG. 6 to the position shown in dotted lines, where it engages the tab 38. When the element 16 reaches the end of its path, the surface 20 engages the upper surface of the guide 14, as shown in dotted lines in FIG. 4. The rib 54 engages the top 12 and a magnetic circuit through the top, the end wall 4 and the tab 38 holds the follower 34 against the tab 38.

The center of gravity of the follower 34 is at its central axis. The tabs 38 and 40 are offset from the central axis of the follower 34 and tend to cause sliding between the follower 34 and the guide 14 when the follower strikes the tabs in moving from one end of its path to the other. This incremental rotation of the follower presents different portions of the grooves 44 for engagement by the contact wires 46 and 48, so that the grooves wear evenly.

A sealant may be applied along the lower edges of the guide 14 at the joint between the guide and the side and end walls of the housing to form a sealed enclosure for the follower and the contact wires. The sealant should also be applied around the interior of the bottom cover 50. The sealed enclosure may be evacuated or filled with inert gas.

In order to insure good electrical contact between the groove 44 and the contact wire, the end of the wire projects into the path of the follower, so that the wire is engaged by the follower groove before the follower contacts the tab 38 or 40. Thus, there is a slight rotation of the follower while engaged with the contact wire. This wiping action removes oxidation or surface film that otherwise might interfere with establishing good electrical contact.

The switch embodiment of FIG. 1 may be operated as a single pole single throw switch by connecting one side of a circuit to one of the contact wires 46 and the other side of the circuit to the other contact wires 46. When the follower 34 is in the position shown in FIG. 1, the switch is closed and the circuit is conductive. The other pair of wires 48 are not connected in a circuit and, in fact, may be removed from the assembly. When the actuator 16 is displaced 90° from the position shown in FIG. 1 by swinging the lever 30 to the opposite end of the slot 32, the follower 34 snaps over to the position shown in dotted lines in FIG. 1, and the circuit between the contact wires 46 is therefore disconnected. The switch may be wired for double throw double pole operation by connecting a power source with a common conductor between one of the wires 46 and one of the wires 48. By connecting separate circuits to the other wires of each pair, one or the other circuit may be energized by swinging the lever 30 from one position to the other. In still another arrangement, the pairs of conductors 46 and 48 may be connected in entirely separate circuits whereby operation of the lever 30 opens one circuit and closes the other circuit. These various circuit arrangements are merely illustrative and other alternate arrangements may be utilized as desired.

Figure 7:
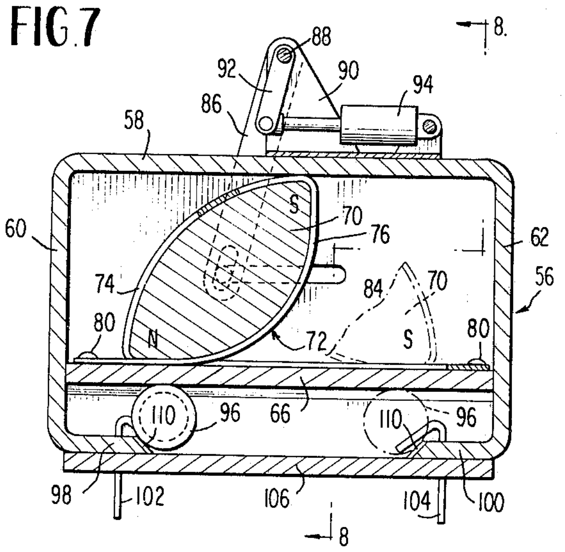
FIG. 7 is a cross sectional view of a second embodiment of the switch of this invention along the line 7—7 in FIG. 8.
Figure 8:
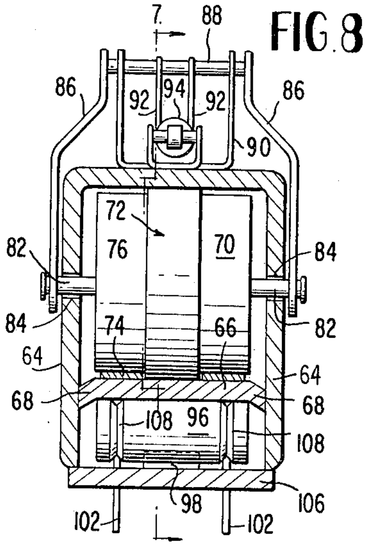
FIG. 8 is a cross sectional view of the switch along the line 8—8 in FIG. 7.
Figure 9:
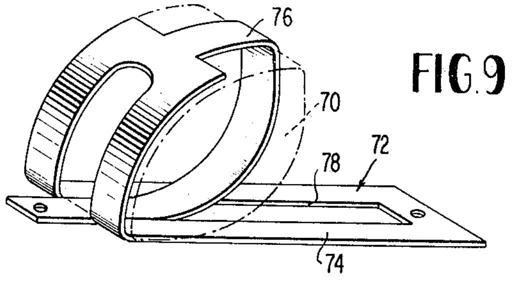
FIG. 9 is a schematic view of the retention band of the switch in FIG. 7, showing the magnetic actuating element in phantom lines.

A second embodiment of the invention is illustrated in FIGS. 7 to 9. The switch includes a housing 56 with a top 58, opposite end walls 60 and 62, and side walls 64. A guide 66 is secured in the housing and extends between the opposite end walls 60 and 62. The guide 66 is generally in the form of a channel having flanges 68 along opposite edges. An actuating element 70 is supported on the supper surface of the guide 66. The actuating element 70 is permanently magnetized with a north pole N and a south pole S across the width of the element at the regions shown in FIG. 7. The actuating element 70 is held in place on the guide 66 by a flexible band 72. The band 72, as shown in FIG. 9, encircles the actuating element 70. The band 72 includes a slotted portion 74 and a tongue portion 76, which are joined end-to-end. The slotted portion 74 includes a longitudinal slot 78. The width of the slot 78 is slightly greater than the width of the tongue 76. The slotted portion 74 extends between the actuating element 70 and the upper surface of the guide 66, and the tongue portion 76 projects through the slot 78 and between the actuating element 70 and the guide 66. Thus, the free ends of the tongue portion 76 and the slotted portion 74 extend in opposite directions. These free ends are each secured to the guide 66 by rivets 80 or other suitable means. Sufficient frictional resistance between the surface of the band 72 and the surface the actuating element 70 to prevent relative sliding movement therebetween is achieved by tensioning the band before it is fastened to the guide 66.

Journal pins 82 on opposite sides of the actuating element 70 project outwardly through slots 84 in the walls 64 of the housing. Levers 86 are slotted at one end and engage the journal pins 82. The opposite end of each lever 86 is secured on a counter shaft 88. The shaft 88 is supported for rotation on a bracket 90, which is mounted on the top 58 of the housing. A pair of levers 92 are also secured on the shaft 88. A power device 94, such as a hydraulic or pneumatic ram is connected at one end with the bracket 90. The connecting rod at the opposite end of the power device 94 is attached to the lever 92.

A follower 96 that is formed of ferromagnetic material is supported on the lower surface of the guide 66 and the flanges 68 slope outwardly to urge the follower to remain centered on the guide as it rolls along its path from one end to the other. Tabs 98 and 100 project inwardly from the opposite end walls 60 and 62 in position to engage the follower 96 at the opposite ends of its path of movement. Electrical contacts 102 and 104 are mounted on an insulated bottom plate 106 in position for engaging the grooves 108 in the follower 96. An insulating layer 110 is provided between the follower 96 and the electrically conductive tabs 98 and 100.

The guide 66 is formed of a ferromagnetic material. The external magnetic circuit established between the north and south poles of the actuating element 70 when it is in the position shown in full lines in FIG. 7, incudes the top 58, the end wall 60, the tab 98 and the follower 96. Also, a parallel leg of the circuit extends between the junction of the end wall 60 with the guide 66 and north pole N of the element 70. The total magnetic reluctance of these parallel paths is the reciprocal of the sum of the inverse reluctance of each leg or branch. Thus, the total reluctance of the parallel branch is less than the reluctance of the branch through the follower 96 alone, as in the case illustrated schematically in FIG. 4. The effect of the reduced total reluctance of the parallel branches is to reduce the flux linkage between the actuating element 70 and the housing 58. Consequently, a smaller actuating force is required to displace the element 70 from one position to the other. Accordingly, merely by substituting a ferromagnetic guide 66 for a non-magnetic guide the characteristics of the switch are altered.

When the power device 94 is operated, the lever 92 swings counterclockwise, as viewed in FIG. 7, thereby displacing the actuating element 70 from the position shown in FIG. 7 to the opposite position, wherein the south pole S is in close proximity to the upper surface of the guide 66, and the north pole N is closely adjacent the top 58. During the course of displacement of the actuating element 70, the follower 96 is displaced rapidly from the position shown in full lines in FIG. 7 to the position shown in dotted lines.

Figure 12:
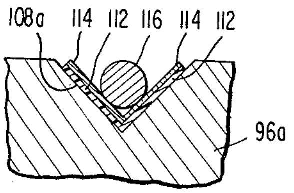
FIG. 12 is an enlarged cross sectional view of the contact roller and contact wire along the line 12—12 in FIG. 10.
Figure 10:
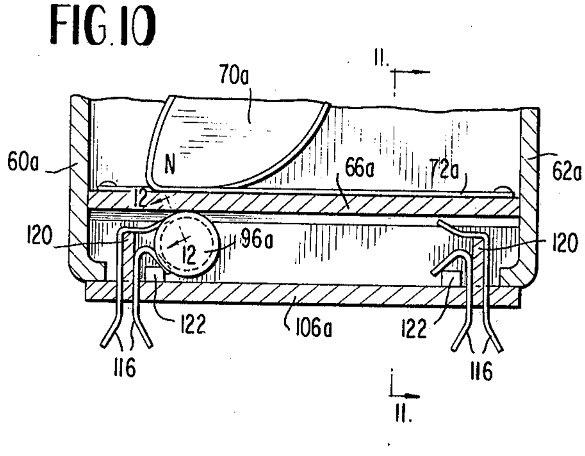
FIG. 10 is a cross sectional view of a modified form of the switch of FIG. 7.
Figure 11:
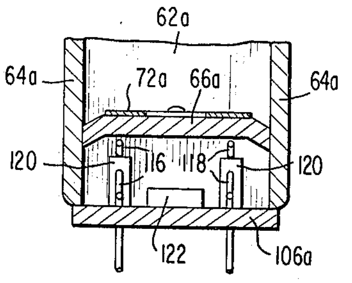
FIG. 11 is a cross sectional view of the switch along the line 11—11 in FIG. 10.

A modified form of the second embodiment of the switch of this invention is illustrated in FIGS. 10 to 12. The upper portion of the switch is substantially the same as that illustrated in FIGS. 7 to 9, and includes end walls 60a and 62a. The actuating elements 70a is supported on the upper surface of the guide 66a and held in place by the hand 72a. The bottom plate 106a closes the bottom of the housing. The follower 96a rolls along the lower surface of the guide 66a from one end of the path to the other. The roller 96a has a plurality of grooves 108a corresponding to the grooves 108 shown in FIG. 8. Each groove in the follower 96a has an insulating layer 112 extending around the circumference of the follower. Superimposed on the insulating layer 112 is an electrically conductive layer 114. The layer 114 preferably is gold plating and the insulating layer 112 is a plastic material that is adhesively bonded to the follower 96a.

A pair of electrical contact wires 116 and 118 are provided at each end of the path of the follower 96a. The pairs of contacts are supported on posts 120 projecting upwardly from the bottom of the housing 106a. The posts 120 are formed of insulating material and are sufficiently rigid to maintain the cantilevered ends of the contact wires in position to engage the grooves in the follower 96a. When the follower 96a is in engagement with the contact wires 116 and 118, the plating 114 conducts current between the ends of the pairs of contact wires 116 and 118. A block 122 is mounted on the bottom plate 106a at each end of the path of the follower 96a. The purpose of the block 122 is to cause the follower 96a to turn about its central axis, and thereby changing the point of contact between the grooves and the contact wires.

Figures 13, 14, 15, 16, 17, 18:
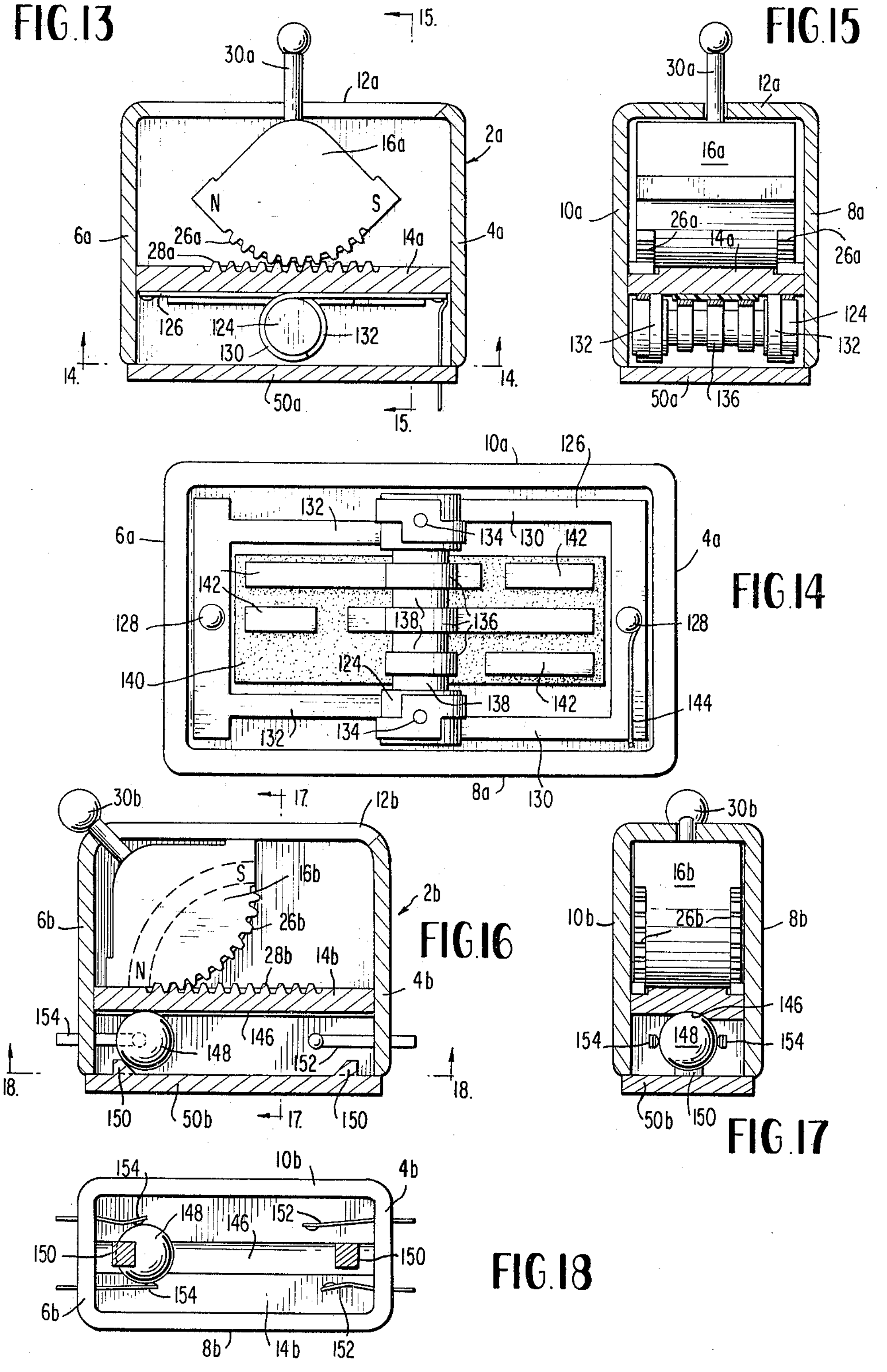
FIG. 13 is a cross sectional view of a modified form of the switch of FIG. 1.
FIG. 14 is an enlarged cross sectional view of the switch along the line 14—14 in FIG. 13.
FIG. 15 is a cross sectional view of the switch along the line 15—15 in FIG. 13.
FIG. 16 is a cross sectional view of a second modified form of the switch of FIG. 1.
FIG. 17 is a cross sectional view of the switch along the line 17—17 in FIG. 16.
FIG. 18 is a cross sectional view of the switch along the line 18—18 in FIG. 16.

A modified form of the first embodiment of the switch of this invention is illustrated in FIGS. 13 to 15. The modification is concerned primarily with the follower and contact structure. The switch mechanism includes a housing 2a having end walls 4a and 6a, and a top 12a. An actuating element 16a is mounted in the housing. The element 16a is permanently magnetized with a north pole N and a south pole S, of substantially the same configuration as the actuating element 16 in FIG. 1. The actuating element 16a is supported on a guide 14a, with a gear segment 26a cooperating with a rack 28a to prevent sliding of the actuating element relative to the guide 14a. A lever 30a displaces the actuating element 16a from one end to the other of its travel. The lever 30a is shown in an intermediate position. The actuating element 16a is stable and balanced when the north pole N or the south pole S are in close proximity to the upper surface of the guide 14a, due to the flux linkage between the respective poles of the permanent magnet and the housing 2a, as previously described. In the position shown in FIG. 13, the actuating element 16a is less stable than in either extreme position. The guide 14a may be formed of a ferromagnetic or non-magnetic material, depending upon the characteristics desired.

Below the guide 14a, a follower 124 is mounted for reciprocating motion between the opposite end walls 6a and 4a. A band 126 is secured at its opposite ends to the lower surface of the guide 14a by screws 128 or other means. The band 126 includes a pair of outer strip portions 130 which are joined to the ends of a pair of inner strip portions 132. The band 126 is secured to the follower 124 by spot welding or other suitable means indicated at 134. The fastener 134 may be eliminated if sufficient tension is imposed in the band 126 to prevent sliding of the follower 124 relative to the band 126. The strips 130 and 132 are secured to the guide 14a only at the ends, and accordingly, these strips are progressively wrapped and unwrapped from the follower 124 as it moves along the bottom surface of the guide 14a. The follower 124 has a plurality of cylindrical contact surfaces 136. These surfaces are separated from each other by grooves 138.

Projecting downwardly from the bottom surface of the guide 14a is a contact plate 140 of insulating material on which are mounted a plurality of electrically conductive contact strips 142. An insulated conductive wire 144 extends through the bottom plate 50a of the housing and is connected with the band 126, which is also electrically conductive. The follower is formed of a ferromagnetic material and is electrically conductive. The surfaces 136 thus conduct current to the strips 142. The spaces provided along the length of each strip 142 are sufficiently wide that they are not bridged by the contact surfaces 136 as the follower 124 rolls along the bottom surface of the guide 14a. Appropriate leads, not shown, from the various portions of the strips 142 are connected with terminals on the outside of the housing.

The actuating element 16a is initially positioned at one end of its stroke with the lever 30a at the extreme left end of the top 12a. In this position, current is conducted from the wire 144 through the band 126, through the follower 124 to the two upper strips, as viewed in FIG. 14. When the lever 30a is displaced toward the right, the follower moves rapidly from one end of its path to the other, in the same manner as the follower 34, as previously described with respect to FIGS. 4 to 6. In moving from left to right, as viewed in FIG. 14, the follower contact surfaces 136 engage the various other strip portions 142 for closing external circuits connected with these strips. Since the diameter of each cylindrical surface 136 is smaller than the follower ends, the surfaces 136 slide relative to the portions 142 to ensure good electric contact.

A second modification of the first embodiment of the switch mechanism of this invention is illustrated in FIGS. 16 to 18. The housing 2b includes a top 12b, opposite ends 4b and 6b and opposite sides 8b and 10b. A permanently magnetized actuating element 16b with a north pole N and a south pole S is mounted in the housing 2b. The actuating element 16b is supported on a guide 14b and movable along the upper surface of the guide 14b by a lever 30b, from the position shown in FIG. 16 to a position wherein the south pole S is immediately adjacent the upper surface of the guide 14b. A gear segment 26b cooperates with a rack 28b at each side of the actuating element 16b to prevent sliding of the element relative to the guide. The housing, the actuating element and the guide have substantially the same structure as the corresponding components in FIG. 1.

The lower surface of the guide 14b has a groove 146 extending longitudinally along the guide from adjacent one end wall 4b to the other end wall 6b. A ball follower 148 of ferromagnetic material rides in the groove 146 in response to the position of the actuating element 16b. The bottom of the housing 2b is closed by a cover 50b having projectings 150 in the path of the ball 148. These projections cause slight skidding of the ball 148 relative to the groove 146 as it reaches the end of its path of movement. This skidding occurs because the projection 150 strikes the ball 148 below the center of gravity of the ball, and thereby distributes wear over the entire surface of the ball.

The terminals of the contacts 152 and 154 are preferably offset laterally from each other so that one of the contacts engages the ball before the other contact. This causes the ball to turn about a vertical axis as it moves into engagement with the contacts. Furthermore, the groove 146 is asymmetrical so that the ball 148 rotates in an inclined plane, thereby assuring that the contact terminals engage different portions of the surface of the follower 148 to prevent grooving or uneven wear of the follower surface.

The modified switch of FIGS. 16 to 18 operates in the same manner as the switch in FIG. 1, but the housing may be made more narrow, since the entire follower is displaced into the gap between the contact terminal and the diameter of the ball need only be large enough to provide an adequate air gap between the terminals to avoid arcing.

FIGS. 19 and 20 illustrate a third modification of the switch mechanism of the first embodiment, as shown in FIG. 1. This modified form includes a housing 2c having opposite end walls 4c and 6c and opposite side walls 8c and 10c. An actuating element 16c is mounted in the housing 2c and is permanently magnetized with a north pole N and a south pole S, as shown in FIG. 10. The actuating element 16c is supported for rolling movement on a guide 14c. The structure of the switch mechanism above the guide 14c is substantially the same as is illustrated and described with respect to the switch mechanism of FIG. 1.

The bottom of the housing 2c is closed by a plate 50c. A flexible band 156 having a slotted portion 158 and a tongue portion 160 is secured at its opposite ends to the lower surface of the guide 14c. The band 156 encircles a follower 162, with the slotted portion 158 being secured to the guide 14c by a screw or other suitable means adjacent the end wall 6c. The tongue portion 160 is secured to the guide 14c, adjacent the opposite end wall 4c. The follower 162 has a curved surface adjacent the guide 14c and the follower includes a ferromagnetic layer 164 which is attracted to the respective magnetic poles of the actuating element 16c in the same manner as the follower illustrated in FIGS. 4 to 6. The follower 162 has a curved rolling surface and rolls on this surface from the position shown in FIG. 19 to the opposite position wherein the right end of the follower is adjacent the guide and the left end, as viewed in FIG. 19, is spaced from the guide.

Switch contacts 166 and 168 are mounted on the bottom plate 50c in position to engage the band 156 alternately when the follower 162 is in either extreme position. The band 156 has printed circuit conductors 170 which are connected with a common conductor 172 extending between the conductors 170 and a terminal 174 adjacent the end wall 6c. In accordance with conventional practice, the conductor 172 is insulated from the ferromagnetical layer 164 and metal portions of the band 156, by chemical etching or other techniques.

When the actuating element 116c is displaced from the position shown in FIG. 19 to the opposite end of its travel, the follower 162 swings quickly from the position shown in FIG. 19 to the opposite position in which the right hand end of the follower 162 is in close proximity to the bottom surface of the guide 14c. Of course, the follower does not engage the guide 14c, because the band 156 extends between the follower and the guide. In moving from one position to the other, the follower 162 disconnects the terminal 168 from the conductor 170 and connects the other terminal 166 with the conductor 170, thereby switching current from one switch contact to the other.

FIG. 21 illustrates a fourth modification of the first embodiment of the switch mechanism of this invention. The modified switch includes end walls 4d and 6d and a guide 14d extending between the end walls. An actuating element 16d having a north pole N and a south pole S is mounted in the housing 2d. The upper portion of the switch mechanism shown in FIG. 21 has substantially the same structure and operation as the switch mechanism illustrated in FIG. 1. A cylindrical follower 176 of ferromagnetic material is mounted below the guide 14d for reciprocating movement along the guide. A band 178 having a slotted portion 180 and a tongue portion 182 of substantially the same configuration as the slotted portion 158 and tongue portion 160 of the band 156 illustrated in FIGS. 19 and 20 is attached at opposite ends to the bottom surface of the guide 14d. Sufficient tension is applied to the band 158 to resist rotation or sliding of the follower 176 relative to the band 178. At one end of the follower, a radial contact arm 184 is rigidly secured to the roller. A cover 186 is secured to the lower ends of the walls 4d and 6d to enclose the bottom of the switch housing. The cover 186 has switch contacts 188 and 190 located in position to be engaged by the end of the radial arm 184. Of course, additional contact arms can be provided on either end of the follower 176. Current from a common terminal is conducted to the arm 184 through the band 178 and the follower 176.

When the actuating element 16d is in the position shown in full lines in FIG. 21, the end of the contact arm 184 engages the contact 188 to close an electric circuit. When the actuating element 16d is displaced to the opposite end of its travel, as shown in dotted lines in FIG. 4, the follower 176 is rapidly displaced to a corresponding position directly opposite the south pole S of the actuating element 16d. This movement of the follower 176 causes the contact arm to swing out of engagement with the contact 188 and into engagement with the contact 190. The band 178 prevents rotation of the follower relative to the band, so that the arm 184 remains properly positioned to engage the respective switch contacts. The size of the actuating element 16d relative to the follower size is such that the follower rotates about 180° in moving from one end of its path to the other.

A second modified form of the second embodiment of the switch mechanism of this invention is illustrated in FIGS. 22 and 23. This modified form of the switch includes a housing 56b having a top 58b and opposite end walls 60b and 62b, and opposite side walls 64b. A guide 66b extends from one end wall 60b to the opposite end wall 62b in the housing 56b. A band 72b is secured at opposite ends to the upper surface of the guide 66b and the intermediate portion of the band encircles an actuating element 192. The band 72b includes a slotted portion 74b and a tongue portion 76b of substantially the same construction as shown in FIG. 9. The actuating element 192 is permanently magnetized with a north pole N adjacent one surface portion of the element 192 and a south pole S adjacent the opposite surface portion. The north pole and south pole surface portions are substantially flat. An intermediate bearing portion 194 on the surface of the actuating element 192 extends between the north pole and south pole portions. The intermediate bearing portion is substantially flat and is sufficiently large in relation to the pole surface portions of the actuating element to provide sufficient stability when the bearing portion 194 is supported on the upper surface of the guide 66b. The actuating element 192 is selectively rotated along the guide 66b by a lever 196. The actuating element 192 is stable when supported on any of the three substantially flat bearing surfaces.

Below the guide 66b, a follower 96b is mounted in the housing for longitudinal movement along the guide 66b. Opposite ends of the follower engage sloping flanges 68b which urge the follower to remain centered with respect to the guide. A pair of rails 198 project downwardly from the guide 66b. Each rail has recessed portions 200. The magnetic attraction of the actuating element 192 for the ferromagnetic follower 96b urges the follower into one of the recesses 200, corresponding to the position of the actuating element. The bottom of the housing 56b is closed by a plate 106b and a plurality of contact wires 202 are in position to engage circumferential grooves 108b in the follower 96b.

When the actuating element 192 is in the position shown in FIG. 22, the magnetic attraction between the element 192 and the follower 96b maintains the follower in the position shown in full lines. When the actuating element 192 is displaced approximately 45° by the lever 196, the bearing portion 194 is supported on the upper surface of the guide 66b and in close proximity thereto. The magnetic flux urges the roller to move out of the left hand recess 200 toward the right and into the middle recess 200. In moving into this position, the left hand set of contact wires 202 is disconnected, and the circuit is closed between the middle set of contact wires 202 by current flowing through the follower 96b. Similarly, when the lever 96b is displaced an additional 45°, the south pole surface portion overlies the right hand recess 200, as viewed in FIG. 22, thereby causing the follower 96b to be displaced from the middle recess 200 to the right hand recess 200. In moving in this manner, the follower disconnects the middle set of contacts 202 and establishes a circuit between the right hand pair of contact wires 202. Similarly, when the element 192 is returned to the position shown in FIG. 22, the follower moves toward the left until it reaches the position shown in FIG. 22.

Figure 24:
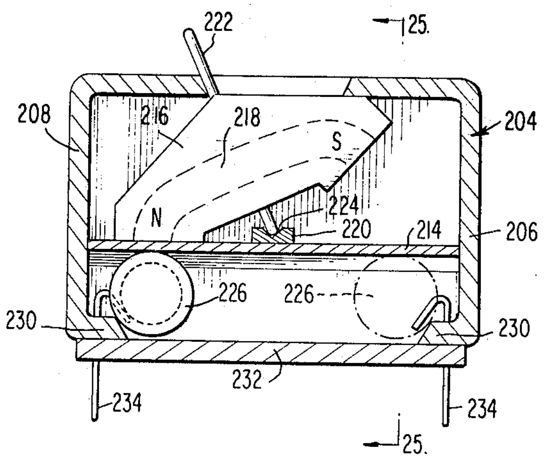
FIG. 24 is a cross sectional view of a third embodiment of the switch of this invention.
Figure 25:
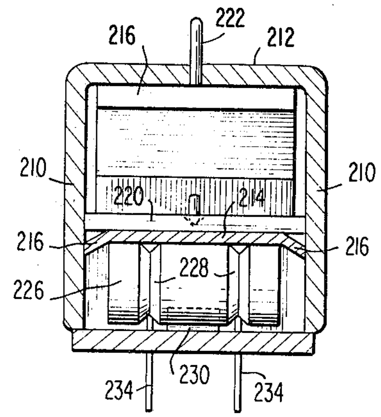
FIG. 25 is a cross sectional view of the switch along the line 25—25 of FIG. 24.

A third embodiment of this invention is illustrated in FIGS. 24 and 25. The switch mechanism includes a housing 204 having opposite end walls 206 and 208, ouposite side walls 210 and a top 212. These portions of the housing are ferromagnetic. A guide 214 is mounted in the housing and extends from one end wall 206 to the opposite end wall 208. The guide 214 is in the form of a thin channel having flanges 216 along opposite edges. An actuating element 216 is mounted in the housing between the guide 214 and the top 213. The actuating element is permanently magnetized, with the magnetic flux being generally concentrated along a flux path illustrated schematically at 218 to define a north pole N and a south pole S. The actuating element 216 is supported for pivoting movement on a transverse bar 220 by a lever 222. The lower end of the lever 222 engages a socket 224 in the bar 220.

Below the guide 14, a follower 226 is mounted for reciprocating movement from the position shown in full lines in FIG. 24 to the position shown in dotted lines. The follower 226 rolls on the bottom surface of the guide 214 and has a pair of circumferential grooves 228 which are spaced apart axially of the follower. Tabs 230 project inwardly from each end wall 206 and 208 into the path of the follower 226. The tabs 230 are provided with a coating or covering for electrically insulating the ferromagnetic follower 226 from the tabs 230 which are also formed of a ferromagnetic material. The bottom of the housing 204 is closed by a cover plate 232 of insulating material. A pair of conductive wires 234 project through the cover plate on opposite sides of each tab 230. The wires 234 are aligned with grooves 228 in substantially the same manner as the wires 46 and 48 of FIG. 1.

The guide 214 in FIG. 24 is made of a very thin material, such as mild steel. The guide may have a thickness of a few thousands of an inch, which is thin enough in relation to the magnetic flux density in the circuit to cause the guide to saturate magnetically. The purpose of this thin magnetic guide is to balance the detenting force exerted by the magnetic flux from the actuating element, and to increase the detention and holding force relative to the weight of the magnetic actuating element. Although the magnetic reluctance in this thin metally membrane is less than it would be if the guide were formed of a non-ferromagnetic material, the holding power or detenting force between the follower and the actuating element is increased because the air gap between the poles of the actuating element is reduced.

Since the top 212 and the end walls 206 and 208 are formed of a ferromagnetic material, a magnetic circuit through the follower 226 and the tab 230 and also through the guide 214 in parallel, through the end wall 208, and the top 212 is established when the element 216 is in the position shown in FIG. 24. By swinging the lever 222 from the position shown in FIG. 24 to the opposite position wherein the south pole S bears against the upper surface of the guide 214, the roller 226 is displaced from the position shown in full lines to the position shown in dotted lines.

Figures 26, 27:
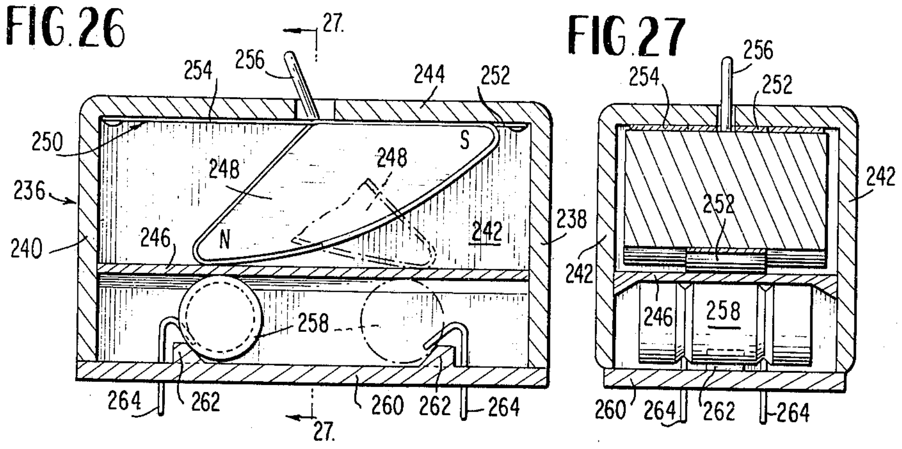
FIG. 26 is a cross sectional view of a fourth embodiment of the switch of this invention.
FIG. 27 is a cross sectional view of the switch along the line 27—27 in FIG. 26.

FIG. 26 illustrates a fourth embodiment of the switch mechanism of this invention. The housing 236 includes opposite end walls 238 and 240 and opposite side walls 242, and a top 244. The housing is divided into upper and lower compartments by a guide 246. An actuating element 248 is suspended from the lower surface of the top 244 by a band 250 having the configuration illustrated in FIG. 9, with a tongue portion 252 and a slot portion 254 corresponding to the tongue and slot portions 76 and 74, respectively, of the band 72 illustrated in FIG. 9. The actuating element 248 is permanently magnetized with a north pole N and a south pole S. The top 244 is preferably formed of a ferromagnetic material for retaining the actuating element 248 in the position shown in FIG. 26, or in the opposite position wherein the north pole N is positioned in close proximity to the lower surface of the top 244. A lever 256 is secured to the actuating element 248 for swinging the element from one position to the other.

Below the guide 246, a ferromagnetic follower 258 is mounted for reciprocating movement along the lower surface of the guide 246. The housing 236 has a bottom cover 260 of insulating material and projections 262 on the interior surface of the cover are in position to engage the surface of the follower 258 to cause skidding of the follower relative to the guide surface in the same manner as the blocks 122, as illustrated and described with respect to FIGS. 10 and 11. A pair of contact wires 264 is provided at each end of the path of travel of the follower 258. The contact wires 264 are positioned to engage the respective grooves 266 in the follower 258.

When the actuating element 248 is in the position shown in FIGS. 26 and 27, the follower 258 remains in the position shown in full lines. Upon swinging the lever 256 toward the right, as viewed in FIG. 26, the actuating element swings clockwise about an axis at the base of the lever 256 that extends transversely to the slotted portion 254 and the tongue portion 252 of the band 250. Thus, the element 248 swings to the position shown in dotted lines in FIG. 26, and due to the relative movement of the north and south poles with respect to the ferromagnetic follower 258, the follower is displaced toward the right to the position shown in dotted lines.

Figure 28:
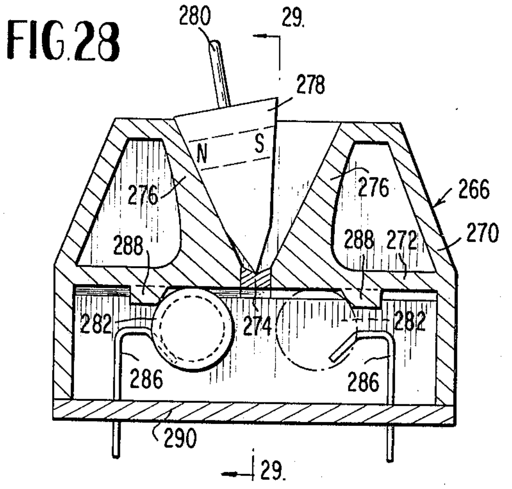
FIG. 28 is a cross sectional view of a fifth embodiment of the switch of this invention.
Figure 29:
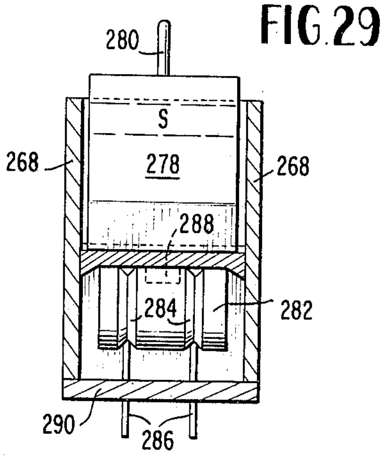
FIG. 29 is a cross sectional view of the switch along the line 29—29 in FIG. 28.

A fifth embodiment of the switch mechanism of this invention is illustrated in FIGS. 28 and 29. The switch includes a housing 266 having opposite side walls 268 and opposite end walls 270. The housing also includes a transverse guide 272 extending between the end walls 270. Midway of the length of the guide 272, a pivot bearing portion 274 is provided. The bearing portion 274 is preferably formed of a magnetic insulator material, that is a material having a relative magnetic permeability of about 1, or the bearing portion 274 may be a ferromagnetic material that has been severely cold worked so that the material becomes magnetically saturated readily. Opposed inclined partitions 276 project upwardly from the bearing bar 274 and cooperate with the side walls 268 to form a receptacle for an actuating element 278. The actuating element 278 is permanently magnetized with a north pole N and a south pole S, as shown in FIGS. 28 and 29. The partitions 276 and the central portion of the guide 272 are formed of ferromagentic material, and the flux linkage between the actuating element 278 and the partition 276 retains the actuating element in the receptacle. The lower end of the element 278 has a knife edge which cooperates with a groove in the bearing portion 274 to allow pivoting of the element 278 in the plane of the drawing of FIG. 28. A lever 280 on the element 278 is provided for swinging the element from one side of the receptacle to the other. Below the guide 272, a follower 282 of ferromagnetic material is mounted for rolling movement from the position shown in full lines to the position shown in dotted lines in FIG. 28. The roller 282 has a pair of circumferential grooves 284 which are in position to be engaged by pairs of contact wires 286 projecting upwardly from the cover plate 288 at the bottom of the housing 266. The cover plate is preferably formed of an insulating material.

When the actuating element 278 is in a position, shown in FIG. 28, the north pole N engages the left hand partition 276 and the magnetic coupling between the guide 272 and the follower 282 causes the follower to remain in the position shown in full lines. When the element 278 is pivoted toward the right by the lever 280 about the bearing block 274, an air gap is created between the north pole N and the adjacent partition 276, thereby substantially reducing the flux linkage between the follower 282 and the adjacent portion of the guide 272. When the south pole S engages the right hand partition 276, the magnetic flux urges the roller 282 toward the right until it reaches the position shown in dotted lines in FIG. 28. In moving from the full line position to the dotted line position, the circuit between the left hand pair of contacts 286 is opened and the circuit between the right hand pair of contacts 286 is closed.

The switch mechanisms of this invention permit a great variety of switch functions to be accomplished with a single basic device. By appropriate design of the magnetic circuit, various actuating characteristics can be achieved. The switch lever, for example, may have a great resistance to displacement as in the conventional toggle light switch, or relatively little resistance as in the conventional mercury type light switch. Since relative sliding movement of the components of the switch mechanism is either entirely eliminated or greatly minimized, these switches have a long service life. Another advantage is that the switch contacts and the follower may be sealed in an enclosure to permit use of the switch in a hazardous environment or to avoid corrosion and pitting of the switch contacts. These switch mechanisms contain few parts and can be inexpensively manufactured.

While the invention has been illustrated and described in a preferred embodiment, it is recognized that variations and changes may be made therein without departing from the invention as set forth in the claims.

I claim:

1. A switch mechanism comprising:

an actuating element, said element being permanently magnetized with first and second regions of opposite magnetic polarity at the external surface of the element, a follower, guide means interposed between said element and said follower, said follower being movable along a path, said element being movable between a first position wherein said first region is adjacent said guide means and said second region is spaced from said guide means and a second position wherein said second region is adjacent said guide means and said first region is spaced from said guide means, said first region and said second region remaining spaced apart longitudinally of said guide means a predetermined distance when said element is in said first and second positions respectively, a housing having a high magnetic relative permeability, said housing having one portion adjacent said element and another portion adjacent said follower, said one portion being in position to engage said element second region when said element is in said first position and to engage said element first region when said element is in said second position, said follower being ferromagnetic, said follower path extending longitudinally of said guide means, and switch contact means adjacent opposite ends of said follower path in position to be engaged by said follower, whereby movement of said element between said first and second positions displaces said follower along said follower path longitudinally of said guide means between said contact means, with magnetic latching of said element through said housing.

2. A switch mechanism according to claim 1 wherein said other housing portion has one branch at one end of said follower path and another branch at the opposite end of said follower path, whereby magnetic flux between said branches and said one housing portion latches said follower at each end of said path.

3. A switch mechanism according to claim 1 wherein said element has an arcuate rolling surface, said element surface being adjacent said guide means and extending between said first and second regions.

4. A switch mechanism according to claim 1 including means for preventing sliding movement of said element relative to said guide means, and means for selectively moving said element between said first position and said second position.

5. A switch mechanism according to claim 4 wherein said sliding preventing means includes gear means between said element and said guide means.

6. A switch mechanism according to claim 4 wherein said sliding preventing means includes a flexible band, said band encircling said element and being crossed between said element and said guide means, opposite end portions of said band being secured on said guide means, whereby said element first and second positions are located between said band end portions.

7. A switch mechanism according to claim 1 wherein said follower has a circular rolling surface on which said follower rolls along said path.

8. A switch mechanism according to claim 7 wherein said follower rolling surface is substantially cylindrical, said follower having a circumferential groove in the surface thereof, said contact means including a wire at one end of said follower path in position to engage said groove.

9. A switch mechanism according to claim 7 including abutment means adjacent one end of said path, said abutment means being spaced outwardly from said guide means a greater distance than the central axis of said rolling surface, whereby impact of said follower against said abutment means causes an increment of rotation of said follower relative to said guide means and thereby distributing wear of said contact wire on said groove.

10. A switch mechanism according to claim 8 wherein said follower has a second circumferential groove in the surface thereof and spaced axially from said first mentioned groove, and said contact means including a second wire at said one end of said follower path in position to engage said second groove, whereby said follower completes an electric circuit between said wires.

11. A switch mechanism according to claim 8 wherein said groove has an electrically conductive lining therein, means for electrically insulating said lining from said follower, and said contact means includes a second wire at said one end of said follower path in position to engage said groove, whereby said lining completes an electric circuit between said wires.

12. A switch mechanism according to claim 8 wherein said follower has circumferential edges at opposite ends, said guide means includes a track extending longitudinally of said guide means, said track having portions overlapping said follower edges, whereby said tracks retain said follower in said path.

13. A switch mechanism according to claim 7 wherein said follower has a pair of circular rolling surfaces spaced apart transversely of said path, said follower having at least one circular contact surface, a contact strip extending longitudinally of said path and in position for portions of said strip to engage said strip at selected locations along said path, said strip portions being electrically conductive.

14. A switch mechanism according to claim 13 including means for restricting sliding of said follower relative to said guide means.

15. A switch mechanism according to claim 7 wherein said follower is spherical, said guide means including a groove extending longitudinally thereof for receiving said follower, said groove being asymmetrical to impart spin to said follower as it moves along said path.

16. A switch mechanism according to claim 7 wherein said follower path is shorter than the radius of curvature of said rolling surface, means for retaining said follower against said guide means, and said contact means including a contact arm in position to engage said follower at one end of said path, and means for conducting electric current to said follower.

17. A switch mechanism according to claim 16 wherein said retaining means includes a flexible band wrapped around said follower, said band having ends extending outwardly in opposite directions from said follower, said band ends being secured to said guide means, said conducting means being incorporated in said band.

18. A switch mechanism according to claim 7 wherein said follower rolling surface is substantially cylindrical, said follower having an arm rigidly secured thereon for swinging movement of said follower along said path, said contact means including a contact element in position to be engaged by said arm.

19. A switch mechanism according to claim 7 wherein said follower has a substantially cylindrical rolling surface, said guide means including detent means for urging said follower toward a predetermined location along said path.

20. A switch mechanism according to claim 19 wherein said detent means includes rails each having a notch therein adjacent one end of said path.

21. A switch mechanism according to claim 7 wherein said actuating element external surface has a bearing portion between said first region and said second region, said bearing portion being inclined relative to said element surface adjacent said first and second regions, means cooperating with said bearing portion urging said element toward said intermediate position when displaced from said first and second positions, said follower has a substantially rolling surface, said guide means includes detent means for urging said follower toward a location along said path opposite said element intermediate position.

22. A switch mechanism comprising:

a housing, said housing having opposite ends and a top extending between said ends, guide means in said housing, siad guide means having an upper face and a lower face, an actuating element in said housing between said top and said upper face, said element being permanently magnetized with first and second regions of opposite magnetic polarity at the external surface of the element, said element having a first position wherein said first region is in close proximity to said upper face and said second region is in close proximity to said top, said element having a second position wherein said first region is in close proximity to said top and said second region is in close proximity to said top, means for selectively displacing said actuating element from said first position to said second positions, said element having a bearing surface extending between said first and second regions, said bearing surface supporting said element for rolling movement along said upper face, means for preventing sliding between said element and said upper face, a ferromagnetic follower in said housing, said follower having a circular rolling surface, said follower surface being supported on said guide means lower face for movement along a path, one end of said path being adjacent said first region when said element is in said first position and the other end of said path being adjacent said second region when said element is in said second position, said housing including a continuous pole piece having a high relative magnetic permeability, said pole piece extending from one end adjacent said guide means through said top to the other end adjacent said guide means, and electrical contact means in position to engage said follower at a predetermined location along said path, whereby displacement of said actuating element from one of said positions is resisted by magnetic latching between said element and said housing.

23. A switch mechanism according to claim 22 wherein said pole piece projects inwardly from each of said ends in close proximity to opposite ends of said follower path, whereby said follower is latched at each end of said path by the magnetic flux through said follower.

24. A switch mechanism according to claim 23 wherein said guide means includes a membrane extending from one housing end to the other housing end between said upper and lower faces, said membrane having a high relative magnetic permeability, whereby flux paths between each of said ends and said actuating element pass in parallel magnetic circuit through said membrane and said follower.

25. A switch mechanism comprising:

a housing, said housing having opposite ends and a top extending between said ends, guide means in said housing, said guide means having an upper face and a lower face, an actuating element in said housing between said top and said upper face, said element being permanently magnetized with first and second regions of opposite magnetic polarity at the external surface of the element, said element having a first position wherein said first region is in close proximity to said upper face and said second region is in close proximity to said top, said element having a second position wherein said first region is in close proximity to said top and said second region is in close proximity to said top, means for selectively displacing said actuating element from said first position to said second position, said element having bearing means thereon, said bearing means cooperating with said guide means for rotating said element between said first and second positions, a ferromagnetic follower in said housing, said follower having a circular rolling surface, said follower surface being supported on said guide means lower face for movement along a path, one end of said path being adjacent said first region when said element is in said first position and the other end of said path being adjacent said second region when said element is in said second position, said housing including a continuous pole piece having a high relative magnetic permeability, said pole piece extending from one end adjacent said guide means through said top to the other end adjacent said guide means, and electrical contact means in position to engage said follower at a predetermined location along said path, whereby displacement of said actuating element from one of said positions is resisted by magnetic latching between said element and said housing.

26. A switch mechanism according to claim 25 wherein said bearing means includes a fulcrum for pivoting said element about a location fixed on said guide means.

27. A switch mechanism comprising:

a housing, said housing having opposite ends and a top extending between said ends, guide means in said housing, said guide means having an upper face and a lower face, an actuating element in said housing between said top and said upper face, said element being permanently magnetized with first and second regions of opposite magnetic polarity at the external surface of the element, means mounting said element for motion between a first position wherein said first region is in close proximity to said upper face at a first location and said second region is in close proximity to said upper face at a second location and said first region is in close proximity to said top, said first and second upper face locations being spaced apart longitudinally of said guide means, means for selectively displacing said actuating element between said first and second positions, a ferromagnetic follower in said housing, said follower having a circular rolling surface, said follower surface being supported on said guide means lower face for movement along a path, one end of said path being adjacent said first region when said element is in said first position and the other end of said path being adjacent said second region when said element is in said second position, said housing including a continuous pole piece having a high relative magnetic permeability, said pole piece extending from one end adjacent said guide means through said top to the other end adjacent said guide means, and electrical contact means in position to engage said follower at a predetermined location along said path, whereby displacement of said actuating element from one of said positions is resisted by magnetic latching between said element and said housing.

28. A switch mechanism according to claim 27 wherein said mounting means including a flexible flat band having opposite ends spaced apart longitudinally of said guide means, said band being looped around said element with adjacent portions of said band crossing to define a common flexure axis, said axis extending transversely of said guide means, said band ends being fixed relative to said guide means.

29. A switch mechanism according to claim 28 wherein said band ends are positioned on said upper face, said flexure axis being between said element and said upper face.

30. A switch mechanism according to claim 28 wherein said band ends are positioned on said top, said flexure axis being between said element and said top.

References Cited

UNITED STATES PATENTS

| | | | |
|---|---|---|---|
| 3,051,805 | 8/1962 | Binford | 335—205 |
| 3,052,774 | 9/1962 | Pike | 335—205 |

BERNARD A. GILHEANY, Primary Examiner

R. N. ENVALL, Jr., Assistant Examiner